(12) United States Patent
Kato

(10) Patent No.: US 6,754,723 B2
(45) Date of Patent: Jun. 22, 2004

(54) SYSTEM COMPRISING HOST DEVICE THAT DETERMINES COMPATIBILITY OF FIRMWARE FOR CONNECTED PERIPHERAL DEVICE AND DOWNLOADS OPTIMUM FIRMWARE IF PERIPHERAL DEVICE IS NOT COMPATIBLE

(75) Inventor: Takeshi Kato, Kawasaki (JP)

(73) Assignee: Minolta Co., Ltd., Osaka (JP)

( * ) Notice: Subject to any disclaimer, the term of this patent is extended or adjusted under 35 U.S.C. 154(b) by 402 days.

(21) Appl. No.: 09/773,588

(22) Filed: Feb. 2, 2001

(65) Prior Publication Data
US 2001/0027517 A1 Oct. 4, 2001

(30) Foreign Application Priority Data
Apr. 2, 2000 (JP) .......................... 2000-27676

(51) Int. Cl.⁷ .......................... G06F 13/00; G06F 17/00
(52) U.S. Cl. .......................... 710/8; 709/217; 709/219; 709/222; 709/223; 709/228; 709/230; 710/10; 710/11; 710/16; 711/103
(58) Field of Search .......................... 709/217, 219, 709/222, 223, 228, 230; 710/8, 10, 11, 16; 711/103

(56) References Cited

U.S. PATENT DOCUMENTS

| | | | | |
|---|---|---|---|---|
| 5,664,195 A | * | 9/1997 | Chatterji | 717/178 |
| 5,867,730 A | * | 2/1999 | Leyda | 710/10 |
| 5,951,639 A | * | 9/1999 | MacInnis | 725/70 |
| 5,954,797 A | * | 9/1999 | Sidey | 709/223 |
| 6,009,480 A | * | 12/1999 | Pleso | 710/8 |
| 6,210,051 B1 | * | 4/2001 | Sakurai | 400/62 |
| 6,438,643 B1 | * | 8/2002 | Ohara et al. | 711/103 |
| 6,467,087 B1 | * | 10/2002 | Yang | 717/168 |
| 6,477,611 B1 | * | 11/2002 | Chang | 710/313 |
| 6,546,419 B1 | * | 4/2003 | Humpleman et al. | 709/223 |
| 6,574,678 B1 | * | 6/2003 | Nykänen et al. | 710/10 |
| 6,584,559 B1 | * | 6/2003 | Huh et al. | 713/2 |

FOREIGN PATENT DOCUMENTS

JP 8-147171 6/1996

* cited by examiner

Primary Examiner—Jeffrey Gaffin
Assistant Examiner—Tammara Peyton
(74) Attorney, Agent, or Firm—Burns, Doane, Swecker & Mathis, L.L.P.

(57) ABSTRACT

In a system comprising a host device and at least one peripheral device connected to the host device, suitable firmware to allow combined operation of both devices is selected and downloaded from among a plurality of firmware stored in memory using the identification codes of each device. As a result, devices which heretofore were incompatible can operation in combination. Furthermore, functions previously unavailable can be used.

9 Claims, 4 Drawing Sheets

Fig.4 firmware compatibility table A

|  | peripheral device A Ver.2 | peripheral device A Ver.1 (current version) |
|---|---|---|
| main unit (printer) Ver.2 | O | O or X |
| main unit (printer) Ver.1 (current version) | O or X | O |

1) no download 2) main unit Ver.2 and device A Ver.2 are download firmware compatibility table B

|  | peripheral device A Ver.2 | peripheral device A Ver.1 (current version) |
|---|---|---|
| main unit (printer) Ver.2 | X | O |
| main unit (printer) Ver.1 (current version) | X | O |

1) no download 2) main unit Ver.2 is download firmware compatibility table C

|  | peripheral device A Ver.2 | peripheral device A Ver.1 (current version) |
|---|---|---|
| main unit (printer) Ver.2 | X | X |
| main unit (printer) Ver.1 (current version) | O | O |

1) no download 2) device A Ver.2 is download firmware compatibility table D

|  | peripheral device A Ver.2 | peripheral device A Ver.1 (current version) |
|---|---|---|
| main unit (printer) Ver.2 | X | X |
| main unit (printer) Ver.1 (current version) | X | O |

1) no download 2) no download

O : compatible   X : not compatible

SYSTEM COMPRISING HOST DEVICE THAT DETERMINES COMPATIBILITY OF FIRMWARE FOR CONNECTED PERIPHERAL DEVICE AND DOWNLOADS OPTIMUM FIRMWARE IF PERIPHERAL DEVICE IS NOT COMPATIBLE

RELATED APPLICATION

The present application is based on Patent Application No. 2000-27676 filed in Japan, the entire content of which is hereby incorporated by reference.

BACKGROUND OF THE INVENTION

1. Field of the Invention

The present invention relates to a system comprising a device such as a printer or the like, and peripheral devices connected thereto.

2. Description of the Related Art

Peripheral devices connected to a printer include scanner, mailbox, stapler and the like. When an old peripheral device is connected to a printer, the peripheral device may not operate, or functions may not be fully used after the printer version has been upgraded.

Rewritable CD-ROM which can be rewritten much like flash memory have become popular, and the firmware included in the printer and peripheral device can be freely rewritten by a modification means. In this way many devices incorporating firmware, not just limited to printers, may have their firmware later modified. Methods previously have been proposed for downloading firmware from an external device to update the firmware if the peripheral device has an old firmware version. For example, a printer system comprising a printer connected to an image processing device for processing image data received from a host is disclosed in Japanese Laid-Open Patent Application No. H8-147171, and according to this method when control software is modified due to replacement of the image processing device or printer, control programs of a plurality of control boards within the printer are downloaded from the image processing device.

Devices incorporating firmware conventionally have been made as independent systems, and it was not contemplated that they would be used while interconnected. The method of the aforesaid firmware update pointedly refers to the update of a printer firmware version, and is limited to firmware having a clear master-slave relationship with the control boards in the printer. Firmware replaceability had not been contemplated. However, there are many advantages to the user when a device can be connected to peripheral devices, since the functions and performance of the device can be expanded. For example, a peripheral device such as a scanner used by a printer of a particular model may be connected to a printer of a different model. Furthermore, the mailbox of a new model printer may be used by connecting to the printer of the previous model.

On the other hand, the work of developing a common interface is not limited to printers, and is ongoing in a wide range of fields including personal computers (PC), PC peripheral devices, and consumer electronic products, and it has been suggested that all such devices will be interconnected in the future. Even most peripheral devices which have functioned independently up to now can be physically interconnected when they have a common hardware interface. Even when the hardware is connectable, problems arise insofar as firmware functions and control methods are not coordinated. Since the firmware of a device and its peripheral devices were not originally developed with the idea of connecting many devices, interconnectability is often a problem in practical terms. Further problems arise depending on the specifications and period of development of the other connected device. Accordingly, it is desirable to achieve functionality of combined devices other than devices for which such connection was considered beforehand.

SUMMARY OF THE INVENTION

An object of the present invention is to eliminate the previously described disadvantages.

Another object of the present invention is to provide suitable firmware version upgrades in a system comprising a device and peripheral devices connected thereto.

A further object of the present invention is to provide easy firmware version upgrades in a system comprising a device and peripheral devices connected thereto.

Still another object of the present invention is to provide a system and method capable of interconnecting even combinations other than devices for which such connection was considered beforehand in a system comprising a device and at least one peripheral device connected thereto.

These and other objects are attained by a host device provided with a communications unit for exchanging information with a peripheral device having firmware (i.e., receiving the identification code of the peripheral device through the communication unit), a first memory for storing the identification code of the host device having firmware, a second memory for storing the firmware of the host device and the peripheral device, a discrimination unit for discriminating an optimum environment for operation of the combination of both devices based on both identification codes and the firmware stored in the second memory, and a controller for shunting firmware stored in the second memory with the firmware of a peripheral device or the host device in accordance with the discrimination result.

These objects of the present invention are further attained by a host device provided with a communications unit for exchanging information with a peripheral device having firmware (i.e., receiving the identification code of the peripheral device through the communication unit), a first memory for storing the identification code of the host device having firmware, a second memory for storing the firmware of the host device and the peripheral device, a first discrimination unit for discriminating whether or not both devices it is possible for the two devices to operate in combination, a second discrimination unit for discriminating whether or not operation is possible in firmware stored in the second memory when the first discrimination unit determines operation is not possible, and a controller for shunting stored firmware with the peripheral device or the host device when the second discrimination unit determines firmware is stored which makes operation possible.

The invention itself, together with further objects and attendant advantages, will be best understood by reference to the following detailed description taken in conjunction with the accompanying drawings.

BRIEF DESCRIPTION OF THE DRAWINGS

FIGS. 4(A), 4(B), 4(C), 4(D) are firmware exchange tables.

In the following description, like parts are designated by like reference numbers throughout the several drawings.

DESCRIPTION OF THE PREFERRED EMBODIMENTS

The embodiments of the present invention are described hereinafter with reference to the accompanying drawings.

In the printing system of the first embodiment, when a hardware-connectable peripheral device (e.g., a mailbox) is connected to the printer and operation is impossible due to a firmware mismatch between the printer and the peripheral device, the firmware of either or both devices may be modified based on the device type and model identification code so as to make operation possible.

Figure 1:
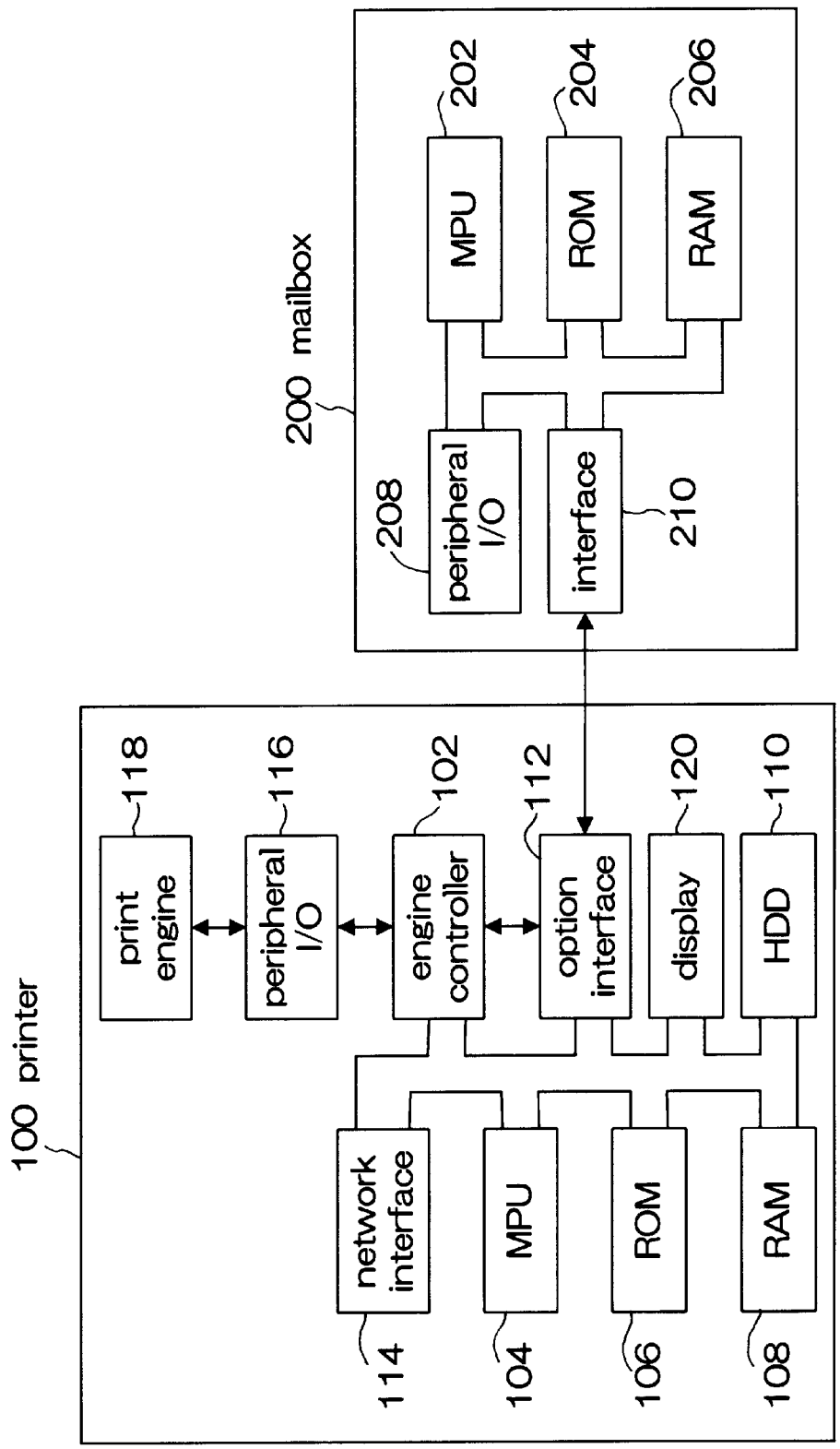
FIG. 1 is a block diagram showing the entire structure of a printing system (first embodiment)

FIG. 1 briefly shows the structure of the control system of the present embodiment. A mailbox 200 connected to a printer 100 is described as an example of a peripheral device. In this printing system, the printer 100 comprises an engine controller 102 for controlling the print engine, microprocessor (MPU) 104 as a data processing unit for processing print data, ROM 106, and RAM 108. The ROM 106 is a rewritable memory such as a flash ROM and the like, and stores firmware which is the control program of the printer. This firmware includes an identification code which identifies the device (printer). The printer 100 is provided with a HDD 110 for storing a plurality of firmware for the printer and the mailbox. Control of the mailbox is controlled by communicating with the engine controller 102 through an option interface 112. The engine controller 102 controls the printout by the print engine 118 through the peripheral I/O 116. The printer 100 is provided with a display device 120 for displaying information to the user. The mailbox 200 has an MPU 202 ROM 204, and RAM 206 used to control the mailbox itself, and controls the mechanism through a peripheral I/O 208. The ROM 204 includes a rewritable memory such as a flash ROM or the like, and this rewritable memory stores the control programs (firmware) of the mailbox. The firmware also includes the identification code for identifying the device (mailbox). An option interface 210 communicates with the data processor (MPU104) of the printer 100, and is capable of transmitting data from the data HDD 110 of the printer 100 to the mailbox 200.

A hardware compatible connector and cable are provided between the printer 100 and mailbox 200. These connectors and cables need not be original equipment. For example, the connector and cable may be used to connect the two devices if a user provides an interface port and exchangeable connector later.

Basic communication between the host device and the peripheral device is necessary. Both devices must store identification codes of the model and version, such that when the peripheral device inquires for the identification code of the printer, that identification code can be obtained. The protocol arrangement for this communication is naturally established beforehand. The means necessary for this communication is a communication means for communicating between hardware-connected printer and peripheral device, and a common protocol for mutually recognizing the identification codes. In this way the devices can be mutually identified as separate devices by the starting sequence after connection.

As described above, the HDD 110 in the printer 100 manages a plurality of firmware of the printer 100 and the printer-connectable mailbox 200. In the printer 100, a determination means determines whether or not functions or operation of both device is possible in combination by modifying the firmware of a device based on the identification codes (i.e., whether or not there is compatibility). When the determination means determines operation is possible, a download means downloads the firmware of the printer or the mailbox from the HDD to the memory of the device, and the firmware is updated. The HDD 110 for storing firmware in the printer is provided for this reason. The firmware of each connected device is downloaded from a recording medium such as a memory card, floppy disk or the like, and managed on the HDD 110. The determination means determines whether or not the printer 100 and the mailbox 200 can be operated in combination using the currently incorporated firmware, or determines whether or not the printer 100 and the mailbox 200 can be operated in combination using any firmware stored on HDD 110. Then, firmware is downloaded from the HDD 110 based on the determination result, and the firmware of the printer or the mailbox can be modified.

The firmware to be modified may be firmware for either the printer or the peripheral device or both. The firmware to be modified may be selected as necessary as determined by the determination means. Modifications to match the functions and control method may be performed automatedly based on the identification code. Furthermore, the printer and peripheral device need not be one-to-one. The determination means is capable of determining whether or not operation is possible even when a plurality of peripheral devices are connected to the printer.

In this system, a manufacturer provides a user with information concerning new firmware and combinability. Even printers and peripheral devices which have been heretofore inoperable in combination can have their firmware updated so as to become usable. Furthermore, the manufacturer can respond to user needs by adding new functions even after shipping the printer.

Figure 2:
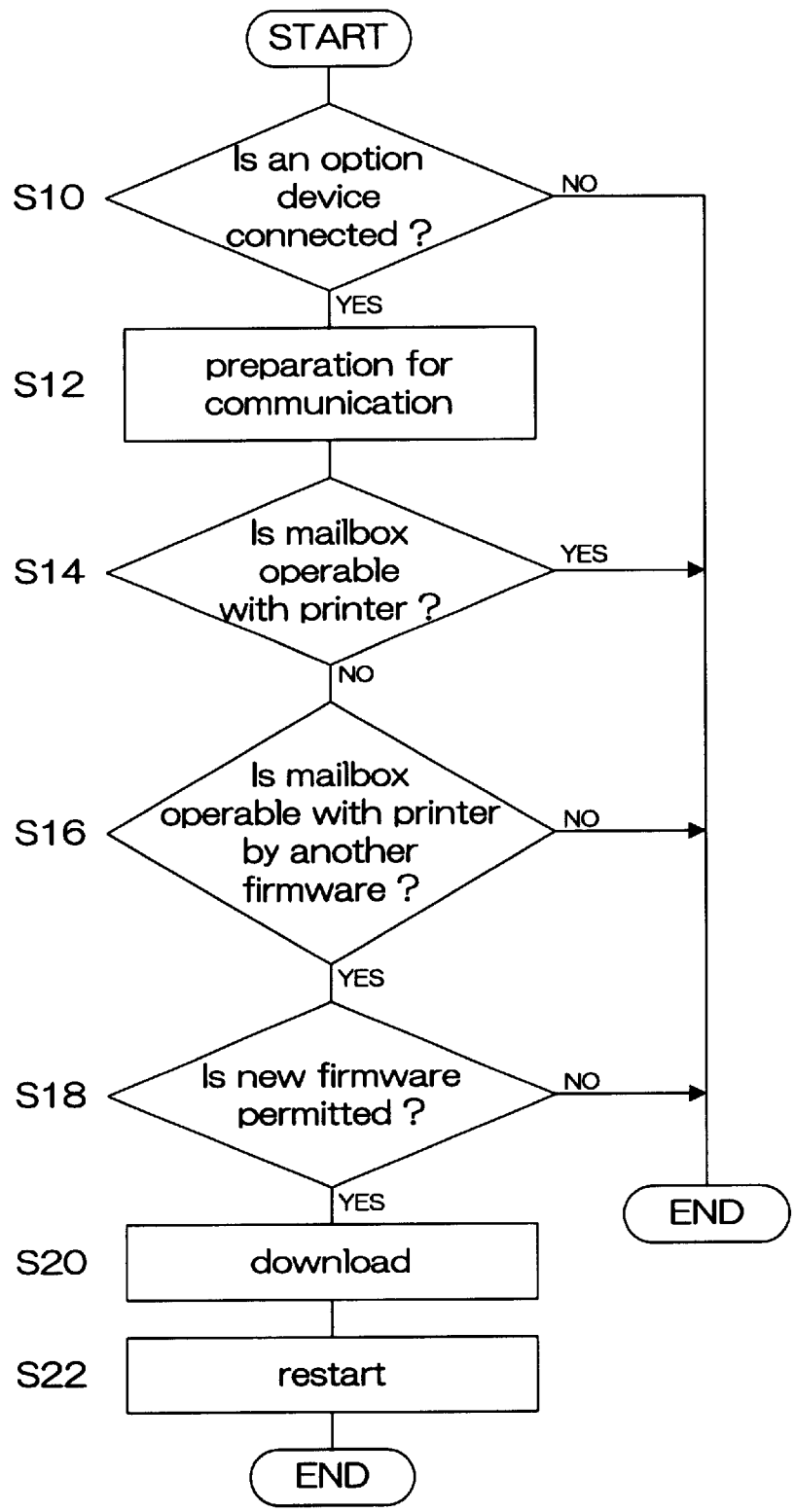
FIG. 2 is a flow chart showing a modification of the firmware.

FIG. 2 shows a flow chart of the MPU104 firmware modification. According to this flow chart, an incompatible new printer is connected to the mailbox used as a different model peripheral device, and the firmware is modified to allow combined use of the devices. When the printer 100 is started, a check is made to verify whether or not an optional device is connected (S10). When a mailbox option is connected as an optional peripheral device, communication is started between the mailbox 200 and the printer 100 via a predetermined communication protocol, and the identification code of the mailbox 200 is initially retrieved (S12). The identification code is a code identifying the type of device, model, and version. The HDD 110 is managed by the manufacturers that provide the firmware, and is normally updated with new information, and stores tables of information regarding the newest combinations. A determination is made as to whether or not the printer and mailbox can be used in combination at the present time based on the identification code of the printer 100 and the identification code of the mailbox 200 (S14). When the current identification codes are determined to be compatible based on the result of the table referencing (i.e., when the mailbox 200 is determined to be operational), the flow is then abbreviated and the normal printing process is executed.

If operation is determined to be impossible (S14: NO), tables based on the identification code are referenced to determine whether or not functions or operations are possible by the combined devices by modifying the firmware of a device (S16). The user also may determined whether or not to modify the firmware.

When it is determined that firmware modification is possible, or when firmware modification is permitted (S18: YES), the necessary firmware is downloaded to a specific device (S20). That is, the firmware for the part of the printer 100 requiring modification or the firmware of part of the mailbox 200 requiring modification is stored in ROM (106 or 204), and updated. The updated firmware includes function and control programs which will render the printer and mailbox compatible. In this way at least one firmware of the printer or the peripheral device is downloaded from the HDD 110 to the ROM (106 or 204) of the specific device, and the firmware is updated. Moreover, the incompatible printer and mailbox operate in combination. After the firmware update process by download is completed, the printing system is restarted (522). In this way the devices are usable as a system.

After the combined use once becomes possible, the information of the combination of the printer and mailbox is updated, and startup can be accomplished quickly without accessing the HDD 110 at each startup.

Even after combined use has been once determined to be impossible, updates will become possible as soon as the manufacturer releases firmware which makes such combination possible by accessing the HDD 110 in the printer periodically.

In another embodiment, the version of the firmware may be normally upgraded to a new version even when the versions of the two devices are already compatible by skipping step S14 in FIG. 2, and normally retrieving new firmware from the tables and downloading such new firmware.

FIGS. 4(A)–4(D) show examples of tables having information on firmware compatibility. The right side in each drawing of FIG. 4 shows the corresponding download in each table.

In the case of the previously described embodiment shown in FIG. 2, firmware is not downloaded because the devices are compatible in each table. On the other hand, in the example in which step S14 of FIG. 2 is skipped, download is executed in each table (In table D, download is not executed because there is no suitable firmware).

Although in the present embodiment the flow is described in terms of providing a management means such as an HDD or the like up to the modification of firmware, the firmware cannot be updated when a management means is not provided or when firmware providing compatibility is not stored in the management means. At such time, the user may be warned that combined operation is impossible, and a modification recommended. Furthermore, the modification method may be automatically printed out, so that the user is aware of the modification method.

When a hardware modification is required for combined operation, a message recommending the hardware modification may be displayed after a combination check, and the modification method may be printed out.

Figure 3:
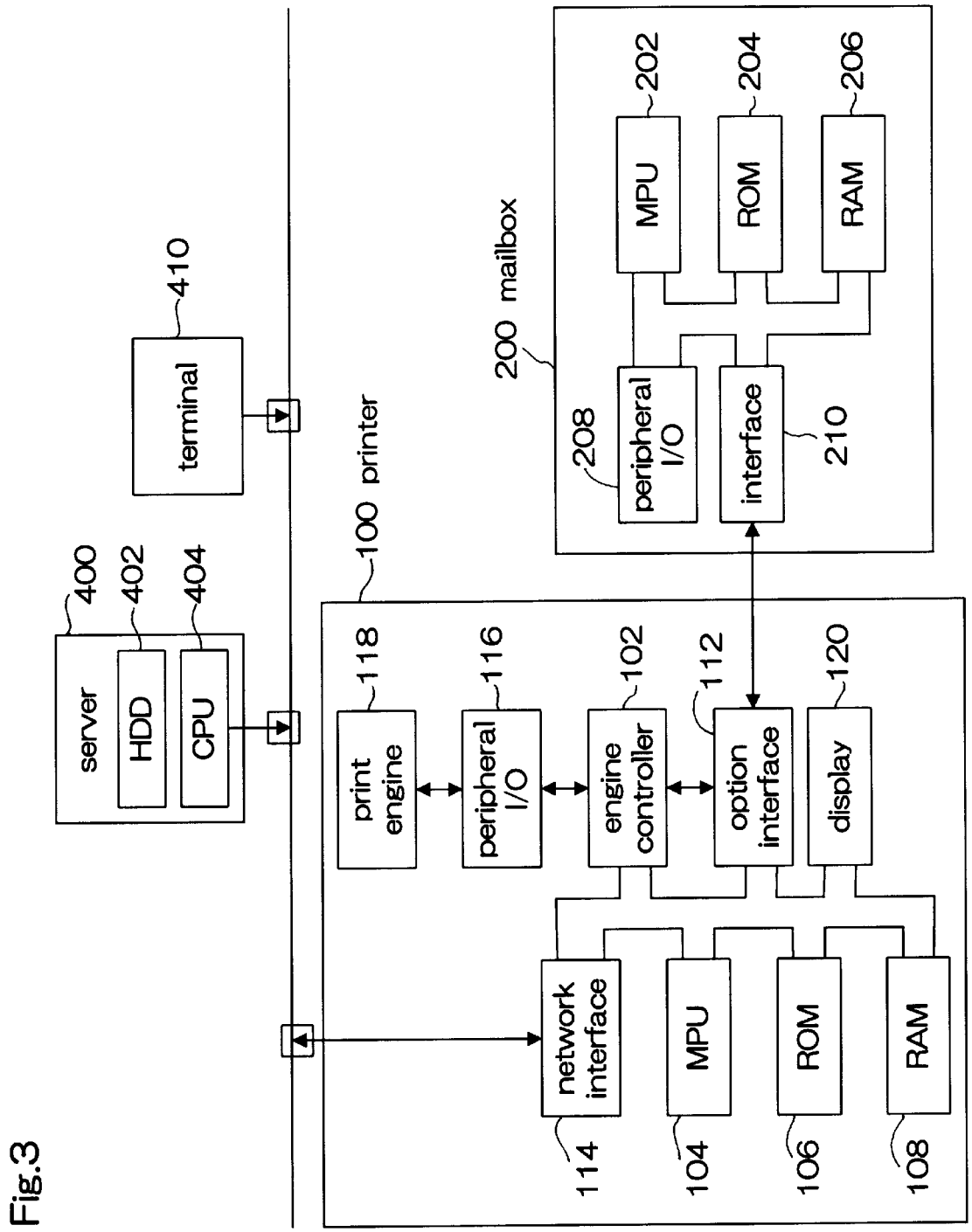
FIG. 3 is a block diagram showing the entire structure of a printing system (second embodiment)

In this embodiment the system is described in terms of the relationship of the connection between the printer and peripheral device, and a mailbox was connected as the peripheral device. However, firmware may be similarly updated to allow combined use of a host device and a peripheral device even when using a sheet discharge option, sheet supply option, or scanner as a peripheral device. Furthermore, the host device need not necessarily be a printer. For example, the present invention is also applicable to the situation when a scanner is the host device and a printer is the peripheral device. The printing system of a second embodiment connected to a network is described below. In this printing system, when a hardware-connectable peripheral device (e.g., a mailbox) is connected to a host printer and the combination cannot operate because the firmware of the printer and peripheral device are incompatible, combined use becomes possible by modifying the firmware of either or both devices based on the identification codes specifying device type and model over the network. FIG. 3 briefly shows the structure of the system control system of the present embodiment. A mailbox 200 connected to a printer 100 is provided as an example of a peripheral device similar to the first embodiment. In this printing system, the printer 100 comprises an engine controller 102 for controlling the print engine, a microprocessor (MPU) 104 as a data processing unit for processing print data, ROM 106, and RAM 108. The ROM 106 is a rewritable memory such as a flash ROM and the like, and stores firmware which is the control program of the printer. This firmware includes an identification code which identifies the device (printer). Control of the mailbox is controlled by communicating with the engine controller 102 through an option interface 112. The engine controller 102 controls the printout through the peripheral I/O 116. The mailbox 200 has an MPU 202, ROM 204, and RAM 206 used to control the mailbox itself, and controls the mechanism through a peripheral I/O 208. The ROM 204 includes a rewritable memory such as a flash ROM or the like, and this rewritable memory stores the control programs (firmware) of the mailbox. The firmware also includes the identification code for identifying the device (mailbox). An option interface 210 communicates with the data processor (MPU 104) of the printer 100. The printer 100 is connectable to a terminal 410 used by a user and a web server 400 on the network 300. The web server 400 is, for example, a terminal for managing manufacturer-provided firmware. The server 400 is provided with an HDD 402 for managing a plurality of firmware for the printer and the mailbox, and a CPU 404 for reading the firmware required from the HDD 402, and controlling the download of the firmware to the devices 100 and 200 through the interface 114 of the printer 100.

In the system shown in FIG. 3, the devices can be used in combined by downloading and modifying the firmware via a flow similar to that shown in FIG. 2. Aspects differing from the flow shown in FIG. 2 are described below. When it is determined that operation is impossible in step S14, the printer 100 transmits the identification code of the printer 100 and the identification code of the mailbox 200 to the server 400. In step S16, the server determines whether or not combined operation of the printer and the mailbox is possible at the present time based on the identification codes (S16). The HDD 402 of the server 400 is managed by the manufacturers that provide the firmware, and is normally updated with new information. A determination is made as to whether or not functions or operation of both device is possible in combination by modifying the firmware of a device referencing the tables based on the identification codes. Furthermore whether or not to update firmware may be determined by the user.

When it is determined that firmware modification is possible, or when firmware modification is permitted, i.e., when a download is possible (S18: YES), the required firmware is downloaded from the HDD 402 to the specific device (S20). That is, the firmware for the part of the printer 100 requiring modification or the firmware of part of the mailbox 200 requiring modification is stored in ROM (106 or 204), and updated. In this way at least one firmware of the printer or the peripheral device is downloaded from the HDD 402 to the ROM (106 or 204) of the specific device, and the firmware is updated similar to the system of the first embodiment. Moreover, the incompatible printer and mailbox can now operate in combination.

Since the firmware of heretofore incompatible devices lacking functions can be automatedly updated to provide new functions and compatibility, new device models are created for connection to other devices, is becomes unnecessary to produce an entirely new product for these functions, and total management cost is reduced.

Devices which otherwise would be discarded due to connection incompatibility can now be reused in other systems. The work of a user or service personnel to match connected devices by replacing control boards and ROM also can be reduced.

Even printing device of different types can be used as in-common connected devices, thus reducing costs. The range of selection for a user selecting a device is also enlarged. A user is readily made aware of the modification method by an output means when a user connects an option.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A host device to which at least one of peripheral devices is connected, said host device comprising:
    an interface which connects a peripheral device with a current firmware;
    a memory which stores firmware of the peripheral devices;
    a decision unit which decides whether or not the connected peripheral device can operate in combination with the host device with the current firmware; and
    a download unit which downloads optimum firmware among the firmware stored in the memory to the connected peripheral device in place of the current firmware when the decision unit decides the connected peripheral device with the current firmware can not operate in combination with the host device, wherein the host device is a printer.

2. The host device as claimed in claim 1, wherein both the host device and the peripheral devices have an identification code, the identification code of the connected peripheral device is received through the interface, and the decision unit makes its decision based on the identification codes.

3. The host device as claimed in claim 1, wherein the download unit downloads latest firmware if any, even though the decision unit decides the connected peripheral device can operate in combination with the host device.

4. A system having a host device, a peripheral device and an external device, said system comprising:
    a network which the host device, the peripheral device with a current firmware and the external device are connected through;
    a memory provided in the external device, said memory storing firmware of peripheral devices;
    a decision unit, in the host device, which decides whether or not the peripheral device with the current firmware can operate in combination with the host device; and
    a download unit, in the host device, which downloads optimum firmware, among the firmware stored in the memory, to the peripheral device in place of the current firmware when the decision unit decides the peripheral device with the current firmware can not operate in combination with the host device, wherein the host device is a printer.

5. The system as claimed in claim 4, wherein both of the host device and the peripheral device have an identification code and the decision unit makes its decision based on the identification codes.

6. The system as claimed in claim 4, wherein the download unit downloads latest firmware if any, even though the decision unit decides the peripheral device can operate in combination with the host device.

7. A firmware updating method used in a network system through which a host device and a peripheral device are connected, said firmware updating method comprising the steps of:
    deciding, in the host device, whether or not the peripheral device with a current firmware can operate in combination with the host device; and
    downloading, from the host device, optimum firmware to the peripheral device in place of the current firmware of the peripheral device, when the deciding step decides the peripheral device with the current firmware can not operate in combination with the host device, wherein the host device is a printer.

8. The firmware updating method as claimed in claim 7, wherein both of the host device and the peripheral device have an identification code and the deciding step makes its decision based on the identification codes.

9. The system as claimed in claim 7, wherein the download step downloads latest firmware if any, even though the deciding step decides the peripheral device can operate in combination with the host device.

* * * * *